United States Patent [19]

Akutagawa et al.

[11] Patent Number: 4,541,503
[45] Date of Patent: Sep. 17, 1985

[54] FOUR-WHEEL DRIVE AUTOMOBILE

[75] Inventors: Hitoshi Akutagawa; Masayoshi Shigemasa; Hiroaki Hayashi, all of Hiroshima, Japan

[73] Assignee: Mazda Motor Corporation, Hiroshima, Japan

[21] Appl. No.: 536,380

[22] Filed: Sep. 27, 1983

[30] Foreign Application Priority Data

Sep. 27, 1982 [JP] Japan ............................... 57-169090

[51] Int. Cl.[4] ............................ B62K 5/04; B62K 17/34
[52] U.S. Cl. ..................................... 180/249; 180/247
[58] Field of Search ..................... 180/247, 248, 249; 74/710.5, 714, 740

[56] References Cited

U.S. PATENT DOCUMENTS

| 4,417,642 | 11/1983 | Suzuki et al. | 180/249 |
| 4,476,952 | 10/1984 | Suzuki | 180/247 |
| 4,476,953 | 10/1984 | Hiraiwa | 180/247 |

FOREIGN PATENT DOCUMENTS 2074516A 11/1981 United Kingdom ............... 180/249

Primary Examiner—Joseph F. Peters, Jr.
Assistant Examiner—Donn McGiehan
Attorney, Agent, or Firm—Fleit, Jacobson, Cohn & Price

[57] ABSTRACT

A four-wheel drive automobile has a driving system which includes a transversely oriented engine unit, a transmission having input and output shafts which extend transversely of the car body, an inter-axle differential gear mechanism, front and rear inter-wheel differential gear mechanisms, and a differential gear lock mechanism. The inter-axle differential gear mechanism, the front inter-wheel differential gear mechanism and the differential gear lock mechanism are arranged coaxially with one another. The differential gear lock mechanism is provided in a part of said inter-axle differential gear mechanism which is positioned at a side of the front differential gear mechanism so that the front differential gear mechanism is located between inter-axle differential gear mechanism and the differential gear lock mechanism.

11 Claims, 3 Drawing Figures

FOUR-WHEEL DRIVE AUTOMOBILE

FIELD OF THE INVENTION

The present invention relates to four-wheel drive automobiles, and more particularly to four-wheel drive automobiles having transversely oriented engines. Specifically, the present invention pertains to four-wheel drive automobiles having inter-axle differential gear mechanism provided with differential gear lock mechanisms.

BACKGROUND OF THE INVENTION

Conventionally, four-wheel drive automobiles have front and rear drive axles which are driven by a common engine. Between the front and rear drive axles, there is provided an inter-axle differential gear mechanism which makes it possible to distribute the engine driving power transmitted from a transmission to the front and rear axles so as to absorb any difference in rotating speed between the front and rear axles which may be produced when the automobile passes through a curved path. In this type of automobile, it is desirable to provide a locking device for the inter-axle differential gear mechanism because the automobile may otherwise encounter difficulties in getting out of a loose soil once either of the front or rear wheels get into such loose soil because the engine driving efforts may totally be transmitted to the wheels which are in the loose soil thereby causing racing of the wheels.

Therefore, it has been proposed for example by the U.S. Pat. No. 3,400,777 to provide a four-wheel drive motor vehicle transmission unit including an inter-axle differential gear unit provided with a differential gear lock mechanism for locking the inter-axle differential gear. In the transmission unit as proposed by the U.S. Patent, the transmission output shaft is connected through a pair of bevel gears with a tubular shaft which is perpendicular to the transmission output shaft. The tubular shaft is connected at one end with a pinion carrier of a planetary type inter-axle differential gear mechanism, the sun gear of the differential gear mechanism being connected with a second tubular shaft passing through the first tubular shaft and the ring gear with the input member of a rear differential gear mechanism having a pair of axially aligned rear axles. One of the rear output shafts is passed through the second tubular shaft so as to be connected with one rear wheel hub. The other end of the first tubular shaft is provided with a one-way overrunning clutch device for locking the first tubular shaft to the second tubular shaft when the differential action tends to vary by more than a predetermined amount to thereby lock the inter-axle differential gear mechanism. The first tubular shaft is further connected through a pair of bevel gears with a propeller shaft which is adapted to be connected with a front differential gear mechanism for front axles.

It should however be noted that this type of arrangement is disadvantageous in that it makes the length of the transmission unit long due to the structure of applying the driving power to the pinion carrier of the inter-axle differential gear mechanism. More specifically, when the pinion carrier is used as an input member, it must be connected at a side thereof with a driving member so that any interference is avoided with the ring gear which is located radially outside the pinion carrier and the sun gear which is located radially inside the pinion carrier. Thus, there must be provided a certain axial space between the inter-axle differential gear mechanism and the driving member. Besides, in the above arrangement, since the rear differential gear mechanism is located at one end of the transversely extending tubular shaft, there must be substantial difference in length between the rear axles. Further, there is a limit in positioning the propellar shaft with respect to the transmission unit, since the bevel gear for driving the propellar shaft must be located on the first tubular shaft axially outwards of the one-way overrunning clutch. The causes restrictions in laying out the propellar shaft.

SUMMARY OF THE INVENTION

It is therefore an object of the present invention to provide, in a four-wheel drive type automobile having a transversely oriented engine, a compact arrangement of an inter-axle differential gear mechanism driven by a drive gear of a transmission, a differential gear lock mechanism for the inter-axle differential gear mechanism, and front and rear differential gear mechanisms.

Another object of the present invention is to provide a four-wheel drive automobile in which the difference in length between right and left front axles can be decreased as much as possible.

It is a further object of the present invention to provide a four-wheel drive automobile which is versatile in determining the location of the propeller shaft with respect to the inter-axle differential gears mechanism.

According to the present invention, the above and other objects can be accomplished by a four-wheel drive automobile which comprises an engine unit disposed with a crankshaft extending transversely of the automobile, transmission gear means having input shaft means driven through clutch means by said crankshaft, output shaft means having drive gear means, and change gear means disposed between said input shaft means and said output gear means, said transmission gear means being arranged so that said input and output shaft means extend transversely of the automobile, inter-axle differential gear means comprised of a planetary gear mechanism having a rotating axis and including a ring gear, a sun gear, pinion means engaged with said ring and sun gears, and a pinion carrier for rotatably carrying said pinion means, said ring gear being engaged with said drive gear means of said transmission gear means, front differential gear means having output members connected with right and left front wheel and an input member carried by said pinion carrier of said inter-axle differential gear means to be driven thereby, rear differential gear means having output members connected with right and left rear wheels and an input member adapted to be driven by said sun gear, differential gear lock means for releasably connecting said ring gear and said pinion carrier of said inter-axle differential gear means, said inter-axle differential gear means, said front differential gear means and said differential lock means being arranged coaxially with one another, said differential gear lock means being provided in a part of said inter-axle differential gear means which is positioned at a side of said front differential gear means.

In a preferable arrangement of the present invention, the drive gear means of the transmission gear means and the ring gear means of the inter-axle differential gear means are in meshing engagement in a plane which is perpendicular to a rotating axis of the inter-axle differential gear and coplanar with a plane in which the ring and sun gears and the pinion means of the inter-axle differential gear means are arranged. It is preferred that the front differential gear means is located between the inter-axle differential gear means and the differential gear lock means.

DESCRIPTION OF THE PREFERRED EMBODIMENT

The invention will be more fully understood from the following description taking reference to the accompanying drawings.

Figure 1:
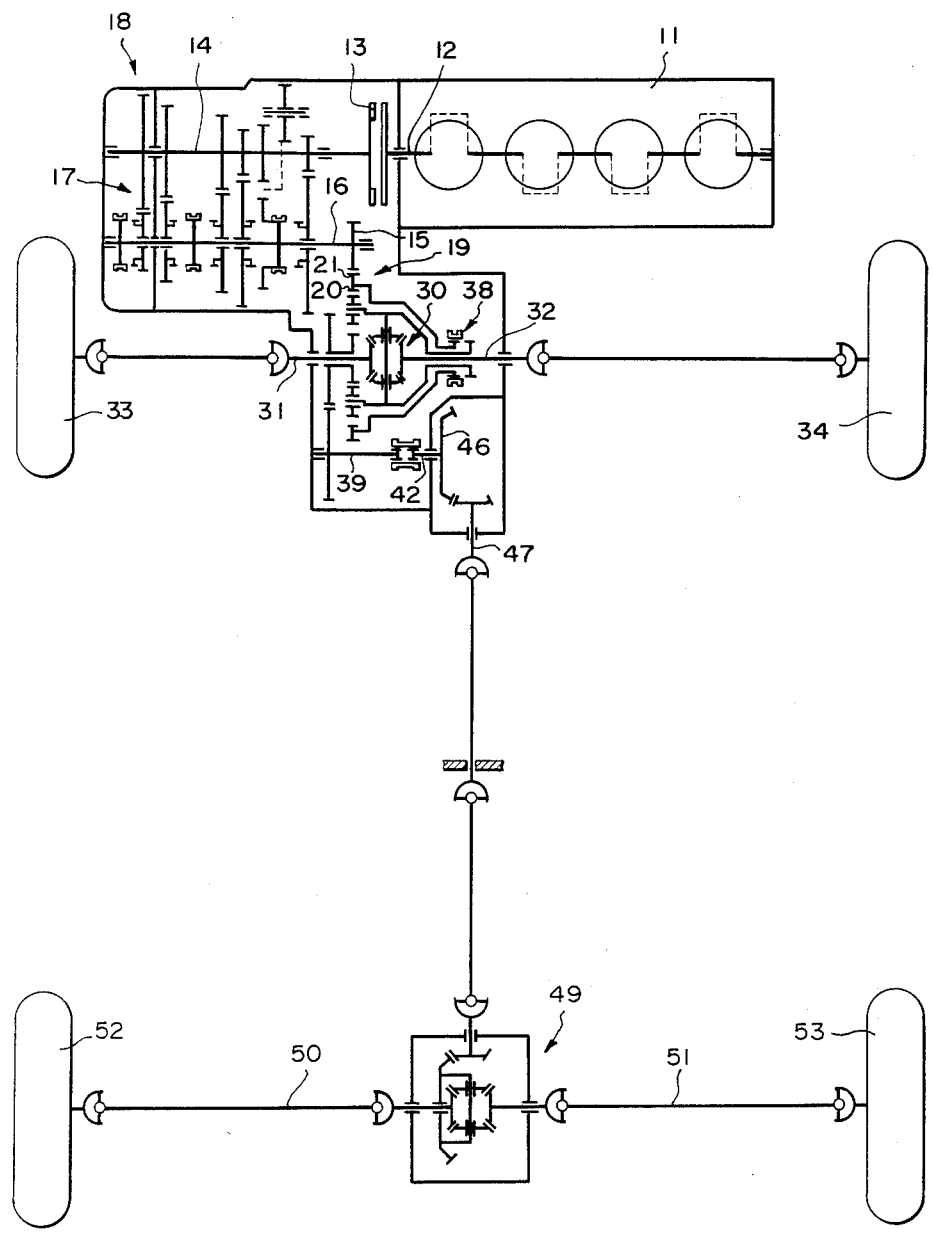
FIG. 1 is a diagrammatic view showing general arrangements of driving mechanisms for a front-engine, four-wheel drive automobile in accordance with one embodiment of the present invention.

Referring first to FIG. 1, there is shown an automobile driving system having an engine 11 which is mounted so that the crank shaft 12 transversely of the car body. A transmission 18 is connected with one end of the crank shaft 12 through a clutch 13. The transmission 18 comprises a transmission case 18a supporting an input shaft 14 which is driven by the crank shaft 12 through the clutch 13 and an output shaft 16 having a drive gear 15 at one end thereof, a speed change gear mechanism 17 being arranged on the input and output shafts 14 and 16. It will thus be noted that the input and output shafts 14 and 16 of the transmission 18 extend transversely of the car body. An inter-axle differential gear mechanism 19 is provided so as to be driven by the drive gear 15.

Figure 2:
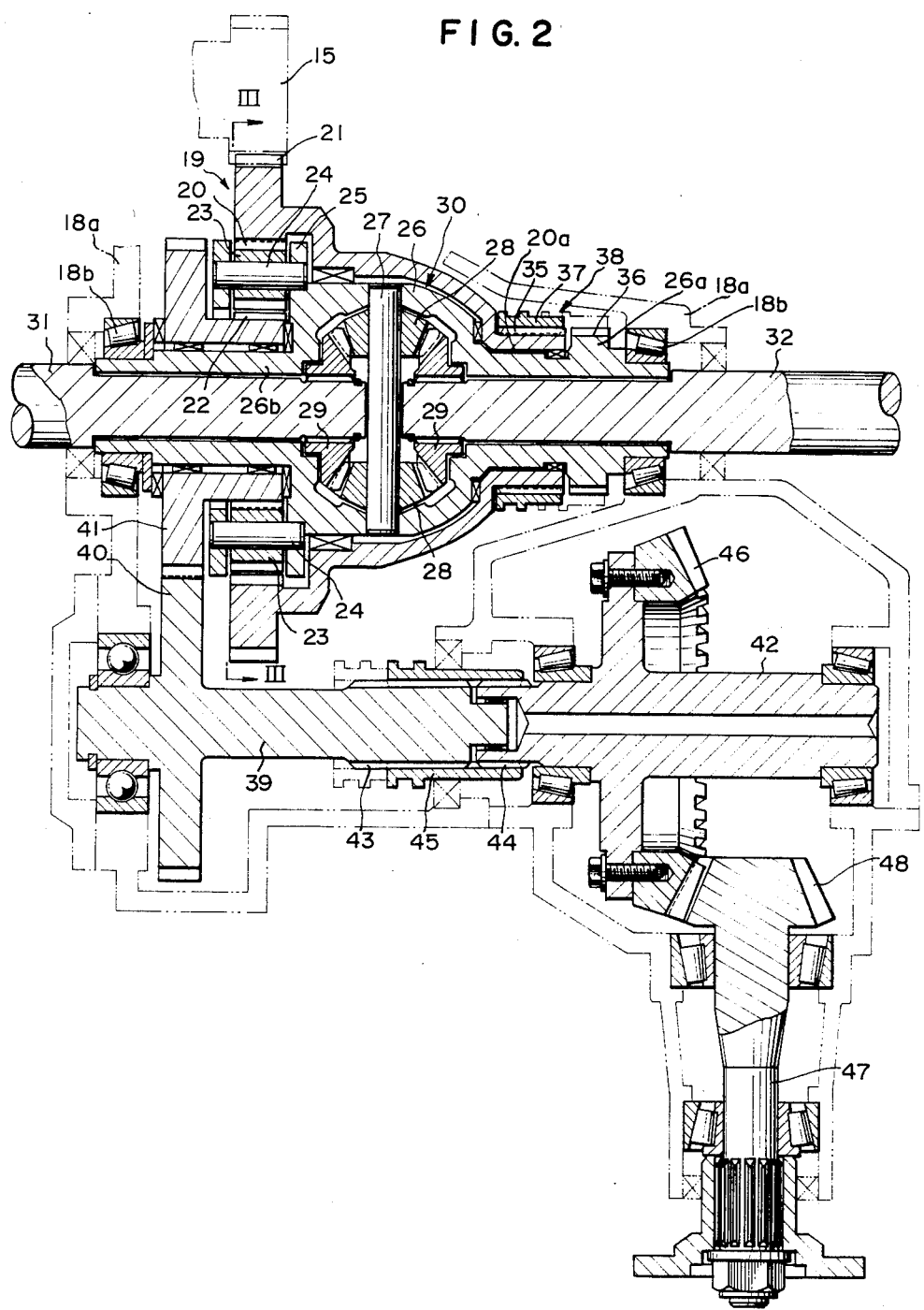
FIG. 2 is a horizontal sectional view of the front and inter-axle differential gear mechanisms in FIG. 1.
Figure 3:
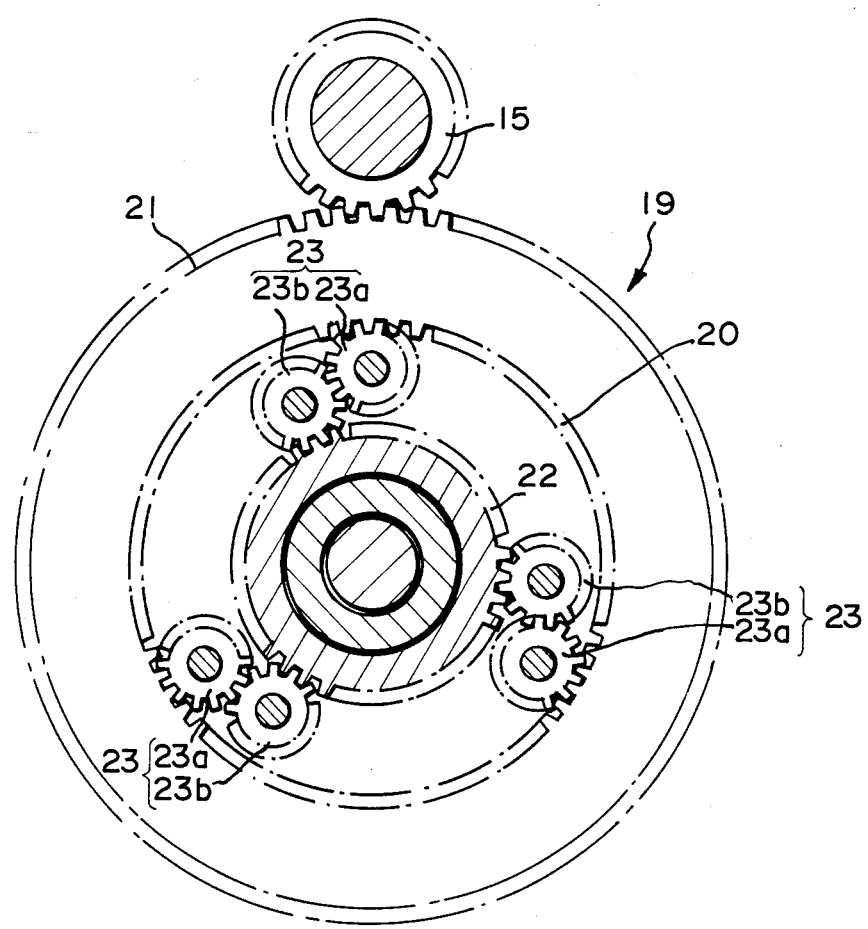
FIG. 3 is a sectional view taken along the line III—III in FIG. 2.

As shown in FIG. 2, the inter-axle differential gear mechanism 19 comprises a planetary gear mechanism composed of a ring gear 20, a sun gear 22 located coaxially with the ring gear 20, a plurality of pinions 23 which are in meshing engagement with the ring gear 20 and the sun gear 22, and a pinion carrier 25 rotatably carrying the pinions 23 through pins 24. Integral with the ring gear 20, there is formed an input gear 21 which is of a large diameter than the ring gear 20. The input gear 21 is meshed with the drive gear 15 of the transmission 18 so as to be driven thereby. Referring to FIG. 3, the pinions 23 are of a double gear type comprising paired pinion gears 23a and 23b, the pinion gear 23a meshing with the ring gear 20 and the pinion gear 23b meshing with both of the pinion gear 23a and the sun gear 22.

A front inter-wheel differential gear mechanism 30 is provided adjacent to the right side of the inter-axle differential gear mechanism 19 as shown in FIG. 1. The front inter-wheel differential gear mechanism 30 includes a differential gear case 26 which is integral with the pinion carrier 25 of the inter-axle differential gear mechanism 19, a pair of pinions 28 being rotatably mounted on a pin 27 which is diametrically extending through the differential gear case 26. The pinions 28 are of bevel type and engaged with bevel gears 29 mounted on transversely inner ends of front left and right drive shaft or axle 31 and 32, respectively. As shown in FIG. 2, the left front drive shaft 31 extends coaxially through the inter-axle differential gear mechanism 19 and connected with a left front wheel 33. The right front drive shaft 32 extends transversely and connected with a right front wheel 34.

The ring gear 20 and the differential gear case 26 have axial extensions 20a and 26a which extend rightwards as seen in FIG. 2. The extension 26a extends beyond the end of the extension 20a and enlarged in diameter so that it has an outer periphery which is of the same diameter as that of the extension 20a. The extension 20a and 26a are respectively formed at their outer peripheries with splines 35 and 36 which are of the same diameter. A sleeve 37 having internal splines is slidably engaged with the splines 35 and 36, and movably axially along the splines. The sleeve 37 is normally placed on the extension 20a and can be moved to an operative or locking position wherein the sleeve is laid over both of the splines 35 and 36 to connect the extensions 20a and 26a with each other. The splines 35 and 36 and the sleeve 37 constitute a differential gear lock mechanism 38 for connecting the ring gear 20 and the pinion carrier 25 in the inter-axle differential gear mechanism 19. As clearly seen in FIG. 2, the differential gear mechanisms 30 and 19 and the differential gear lock mechanism 38 are arranged coaxially with one another, and the front inter-wheel differential gear mechanism 30 is positioned between the inter-axle differential gear mechanism 19 and the differential gear lock mechanism 38.

The differential gear case 26 has a further extention 26b which extends leftwards in FIG. 2. At the extensions 26a and 26b the case 26 is rotatably mounted on the transmission case 18a via bearings 18b.

A first intermediate shaft 39 extends in parallel to the axes of the differential gear mechanism 19 and the front inter-wheel differential gear mechanism 30. A gear 40 is formed integrally with the intermediate shaft 39 and meshed with a gear 41 formed integrally with the sun gear 22 of the inter-axle differential gear mechanism 19. A second intermediate shaft 42 is provided at an axially aligned position with respect to the first intermediate shaft 39. The first and second intermediate shafts 39 and 42 are formed at adjacent end portions 39a and 42a with splines 43 and 44, respectively. A internally splined sleeve 45 is provided so as to be slidably engaged with the splines 43 and 44. The sleeve 45 is movable between an operative position wherein the sleeve 45 is laid over the splines 43 and 44 as shown by full lines in FIG. 2 to connect the first and second intermediate shafts 39 and 42, and an inoperative position wherein it is laid only on the spline 43 as indicated by dotted lines in FIG. 2 to disconnect the first and second shafts 39 and 42 from each other. The second intermediate shaft 41 is provided with an output gear or crown gear 46. The gear 46 meshes with a bevel gear 48 which is formed at the front end of a propeller shaft 47 which extends longitudinally of the car body. The propeller shaft 47 extends to the rear inter-wheel differential gear 49 as shown in FIG. 1, and drive right and left rear wheel 52 and 53 via right and left rear drive shafts 50 and 51 extending laterally from the rear differential gear 49.

The operation of the transmission system of the above arrangement will now be described. The rotation of the crank shaft 12 is transmitted via the clutch 13 to the transmission 18 which is set at a selected reduction ratio. The rotation speed in selectively reduced by the transmission 18, and transmitted from the drive gear 15 on the output shaft 16 through the input gear 21 to the ring gear 20 in the inter-axle differential gear mechanism 19. The power transmitted to the ring gear 20 is divided and transferred through the pinion carrier 25 and the sun gear 22. The power through the pinion carrier 25 drives the left and right front wheel 33 and 34 through the front inter-wheel differential gear 30 and the left and right front drive shaft 31 and 32. On the other hand, the power through the sun gear 22 drives the propeller shaft 47 through the gears 41, 40, the intermediate shafts 39, 42 and the output gear 46. The power from the sun gear 22 also drives the rear wheel 52, 53 through the rear inter-wheel differential gear 49 and the left and right rear drive shafts 50 and 51. In this position, if the sleeve 45 is moved from the operative position indicated by the solid line in FIG. 3 to the inoperative position indicated by the chain line to disconnect the intermediate shafts 39, 42 from each other, the power from the engine 11 will be transmitted only to the front wheels. On the other hand, in the four wheel driving condition in which the first and second intermediate shafts 39 and 42 are connected with each other, if the sleeve 37 in the differential gear lock mechanism 38 is moved from the inoperative position indicated by the solid line in FIG. 2 to the operative position indicated by the chain line to connect the ring gear 20 with the pinion carrier 25, the inter-axle differential gear mechanism 19 is locked up to disable the differential function. As the result, the front and rear wheels 33, 34, 52 and 53 is rotated as a unit irrespective of the loads on the front and rear wheel. Besides, in this embodiment, since the pinions 23 in the inter-axle differential gear mechanism 19 are of double pinion type, the power from the engine 11 is substantially equally distributed to the front and rear wheel 33, 34 and 52, 53.

According to the above arrangement of this embodiment, since the output power of the transmission 18 is transmitted from the drive gear 15 to the ring gear 20 in the inter-axle differential gear mechanism 19 through the input gear 21 formed on the periphery of the ring gear 20, the drive gear 15, the input gear 21 and the center differential gear 19 can be arranged flush, whereby the distance between the input gear 13 and the inter-axle differential gear mechanism 19 can be made small. Therefore, it is possible to decrease the longitudinal length of the whole transmission system. Besides, the fact that the pinion carrier 25 in the inter-axle differential gear mechanism 19 is integral with the differential gear case 26 of the front differential gear mechanism 30 enhances the strength or rigidity of the gear mechanism 19 and the case 26 to make the whole transmission system compact.

Further, since the front inter-wheel differential gear is located between the inter-axle differential gear mechanism 19 and the differential gear lock mechanism 38 which are coaxial with each other, it is possible to decrease the difference in length between left and right drive shafts 31 and 32. Furthermore, because the output gear 46 for driving the propeller shaft is provided on the intermediate shaft 42 which is coaxially arranged with respect to the intermediate shaft 39 and extending parallel to the axis of the inter-axle differential gear mechanism 19 and the front differential gear mechanism 30, there is a versatility in determining the location of the output gear 46, and of the propeller shaft 17 with respect to the engine 11, the transmission 18 and the differential gear mechanisms 19 and 30.

It will be obvious to those skilled in the art that the transmission system of this invention is not limited to an application to a front-engine, four-wheel drive automobiles; it can of course be applied with equal utility to rear-engine, four-wheel drive automobiles. Thus, the scope of the present invention shall not be limited to the details of the illustrated structures but limited only by the appended claims.

What is claimed is:

1. A four-wheel drive automobile which comprises an engine unit disposed with a crankshaft extending transversely of the automobile; transmission gear means having input shaft means driven through clutch means by said crankshaft, output shaft means having drive gear means, and change gear means disposed between said input shaft means and said output shaft means, said transmission gear means being arranged so that said input and output shaft means extend transversely of the automobile, inter-axle differential gear means comprised of a planetary gear mechanism having a rotating axis and including a ring gear, a sun gear, pinion means engaged with said ring and sun gears, and a pinion carrier for rotatably carrying said pinion means, said ring gear being engaged with said drive gear means of said transmission gear means, front differential gear means having output members connected with right and left front wheels and an input member carried by said pinion carrier of said inter-axle differential gear means to be driven thereby, rear differential gear means having output members connected with right and left rear wheels and an input member adapted to be driven by said sun gear, differential gear lock means for releasably connecting said ring gear and said pinion carrier of said inter-axle differential gear means, said inter-axle differential gear means, said front differential gear means and said differential gear lock means being arranged coaxially with one another, said differential gear lock means being provided in a part of said inter-axle differential gear means which is positioned at a side of said front differential gear means.

2. A four-wheel drive automobile in accordance with claim 1 in which the drive gear means of the transmission gear means and the ring gear means of the inter-axle differential gear means are in meshing engagement in a plane which is perpendicular to a rotating axis of the inter-axle differential gear means and coplanar with a plane in which the ring and sun gears and the pinion means of the inter-axle differential gear means are arranged.

3. A four-wheel drive automobile in accordance with claim 2 in which said front differential gear means is disposed between said inter-axle differential gear means and said differential gear lock means.

4. A four-wheel drive automobile in accordance with claim 3 in which said pinion carrier also constitutes a differential gear case of the front inter-wheel differential gear case, said differential gear case having extensions extending in axially opposite directions, said differential gear means being rotatably mounted at said extensions, drive shafts for the right and left front wheels extending through said extensions, respectively.

5. A four-wheel drive automobile in accordance with claim 4 in which said ring gear and sun gear in said inter-axle differential gear means are rotatably supported on said differential gear case of said front inter-wheel differential gear means.

6. A four-wheel drive automobile in accordance with claim 4 in which said sun gear is supported on one of said extensions, said differential gear lock means being provided between the other extension and the ring gear.

7. A four-wheel drive automobile in accordance with claim 1 in which said input member of the rear differential gear means is connected with said sun gear of said inter-axle differential gear means through an intermediate shaft extending parallelly to the rotating axis of the planetary gear mechanism, an output gear provided on said intermediate shaft, and a propeller shaft perpendicular to said intermediate shaft and engaged with said output gear.

8. A four-wheel drive automobile in accordance with claim 7 in which said intermediate shaft is divided into two coaxial parts, one of said parts being driven by said sun gear, said output gear being provided on the other part, and said two parts being connected through further clutch means.

9. A four-wheel drive automobile in accordance with claim 1 in which said pinion means in said inter-axle differential gear means comprises double pinion gears.

10. A four-wheel drive automobile including an engine having a crankshaft extending transversely of the automobile, transmission means having an input shaft extending transversely of the automobile and adapted to be connected with said crankshaft and an output shaft extending parallelly with said input shaft, said output shaft having a driving gear provided at an end adjacent to said engine, an inter-axle differential gear mechanism including a planetary gear mechanism comprised of a ring gear, a sun gear coaxial with said ring gear and a plurality of planet pinions between said ring gear and said sun gear, said planetary gears being rotatably supported by a pinion carrier, said ring gear being integral and coplanar with a driven gear which is larger in diameter and coaxially formed with said ring gear, a first inter-wheel differential gear mechanism having an input member integral with said pinion carrier and a pair of diametrically opposed output members respectively connected with a pair of coaxial first drive shafts extending in parallel with said shafts in the transmission means, said input member of the first inter-wheel differential gear mechanism having axial extensions extending axially opposite directions, one of said extension rotatably carrying said sun gear and the other extension being encircled by an extension formed integrally with said ring gear, said pair of first drive shafts respectively passing through said extensions of the input member of said first inter-wheel differential gear mechanism, differential lock means provided between said extension of the ring gear and said other extension of the input member of the first differential gear mechanism, intermediate shaft means extending in parallel with said shafts in said transmission means, gear means between said sun gear and said intermediate shaft means to transmit driving power from the former to the latter, a propeller shaft perpendicular to said intermediate shaft means and drivingly connected with said intermediate shaft means, a second inter-wheel differential gear mechanism connected with said propeller shaft to be driven thereby.

11. A four-wheel drive automobile in accordance with claim 10 in which said intermediate shaft means includes a pair of coaxial shafts, one being drivingly connected with said sun gear and the other with said propeller shaft, clutch means provided between said coaxial shafts of the intermediate shaft means.

* * * * *